July 4, 1939.  J. G. BAKER ET AL  2,165,024
INDICATING BALANCING MACHINE
Filed Oct. 23, 1935  3 Sheets-Sheet 1

WITNESSES:

Nm. C. Groome

INVENTORS
John G. Baker, and
Frank C. Rushing.
BY
Paul E. Friedemann
ATTORNEY

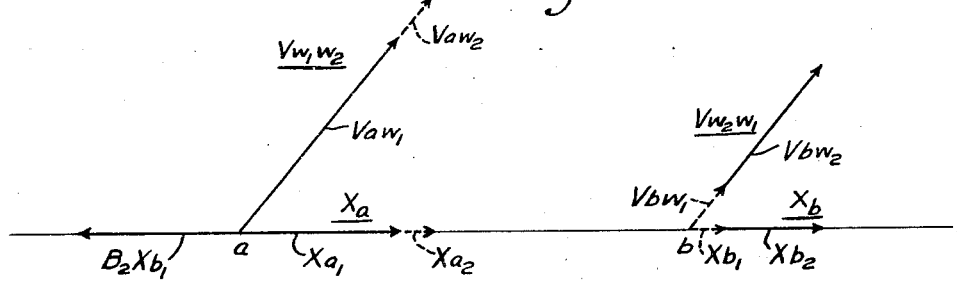
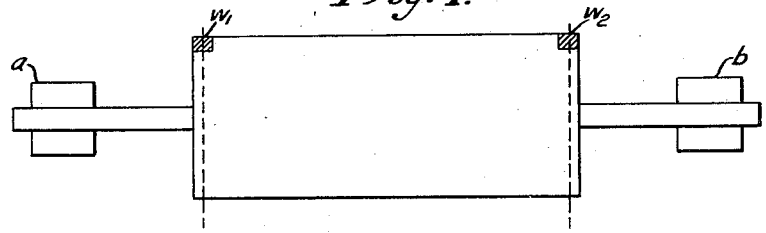
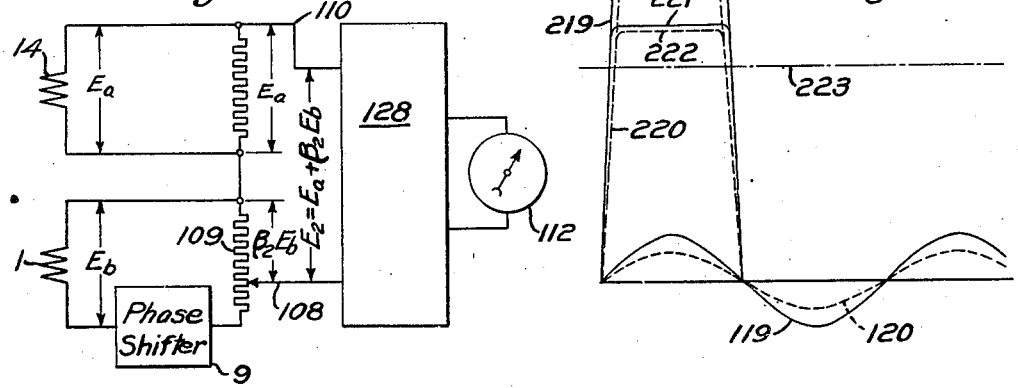

Patented July 4, 1939

2,165,024

UNITED STATES PATENT OFFICE 2,165,024

INDICATING BALANCING MACHINE

John G. Baker and Frank C. Rushing, Pittsburgh, Pa., assignors to Westinghouse Electric & Manufacturing Company, East Pittsburgh, Pa., a corporation of Pennsylvania Application October 23, 1935, Serial No. 46,312

26 Claims. (Cl. 73—51)

Our invention relates to balancing machines, and more particularly to electrical balancing machines for indicating both the position and magnitude of the unbalance of a rotor in two arbitrarily chosen planes of the rotor.

Quantity production of rotors for dynamo-electric machines and other rotors has brought about the need of faster methods of unbalance indication. Furthermore, refinements in machinery with respect to the elimination of both noise and vibration have resulted in the requirement of higher accuracy of balance. With some high speed rotors the necessary accuracy can only be obtained by balancing at the operating speed of the rotor, an operation which heretofore has been usually considered impractical.

To balance a rotor statically and dynamically at a speed very much lower than the normal operating speed of the rotor and which speed differed from the normal operating speed of the rotor, does not always produce the proper balance at the operating speed. This is primarily because of the fact that all rotors cannot be considered for practical purposes absolutely rigid since some rotors have considerable non-symmetrical distortion as the speed is increased.

An unbalanced rigid rotor can be balanced by adding or subtracting weight in two or more arbitrarily chosen planes perpendicular to the axis of rotation. When the effective unbalance in each of these planes is removed the rotor is both statically and dynamically balanced. In a rotor which is not rigid, the above comments also apply but for only one speed of rotation.

Before a general statement of our invention is made and before the objects thereof are pointed out, a brief statement of the balancing devices and methods used heretofore will be helpful in clarifying our disclosure.

Various methods and apparatus have been used heretofore for determining unbalance corrections. The most primitive of the dynamic methods consists in flexibly mounting the rotor and adding or subtracting weight by trial until the mounting or rotor ceases to vibrate during rotation.

A member of types of machines are in use for determining more or less correctly the amount and position of unbalance effect in each of two correction planes without calculation. In general, such machines comprise the combination of some of the following elements: (1) A flexibly restrained carriage, pivoted or in effect pivoted about an axis or point contained in one of the two correction planes, in which the rotor to be balanced may be rotated; (2) An arrangement for measuring the amount and phase with respect to rotation of the motion of this carriage; and (3) Means for introducing a known unbalance effect on the carriage adjustable or variable both in phase or in amount. Existing machines include either elements (1) and (2) or elements (1) and (3).

The element (1), common to all machines of the prior art, namely, the pivoted carriage, has the function of eliminating the effect, on the vibration of the carriage, of the unbalance component in one of the correction planes. This function is accomplished, since one of the balancing planes includes the pivot of the carriage; in this way any force caused by an unbalance in the plane of the pivot is directed to the pivot, or fixed point, and can, therefore, have no effect on the motion of the carriage because the motion can only be a rotation about the pivot.

It has, however, been found that certain rotors, but particularly high speed rotors distort non-symmetrically in coming up to speed, the distortion being enough to make balancing at the normal or near normal operating speed very desirable. Balancing at normal speed in a pivoted carriage is usually very difficult for the following reasons, among others, that (1) distortion of the carriage tends to displace the point of actual pivoting from the pivot point intended; and the large forces caused by the high speed rotation of an unbalanced rotor in a pivoted carriage results in severe vibration difficulties.

One object of our invention is to eliminate the need of a pivot point for the carriage of a rotor that is to be balanced.

Another object of our invention is to provide for electrically determining the magnitude of unbalance of a rotor in two or more arbitrarily chosen planes of a rotor that is to be balanced.

A further object of our invention is to electrically determine the phase, or position, of an unbalance in a rotor.

A still further object of our invention is to provide a balancing machine having a simple mechanical design and the provision of electrical units which, in conjunction with simple mechanical design, eliminate the effect of all building vibrations on the rotor, even if rotated at a frequency corresponding to such building vibrations.

It is also an object of our invention to provide for a high sensitivity of the balancing machine by eliminating the need of the unbalance vibrating the entire carriage such as is required in the pivoted carriage type balancing machines for the rotor being balanced.

It is also an object of our invention to secure indications of unbalance in two or more arbitrarily chosen correction planes without the necessity of making any but the simplest mechanical changes.

Other objects and advantages of our invention will become more apparent from a study of the following specification when considered in conjunction with the accompanying drawings, in which:

Fig. 2 is a sectional view, along section line II—II of Fig. 1, illustrating the flexible mounting of the rotor and electric generating or pick-up means;

Fig. 3 is a schematic showing of the forces acting on an unbalanced rotor at two arbitrarily chosen correction planes;

Fig. 4 illustrates an unbalanced rotor disposed to rotate in a pair of bearings;

Fig. 5 illustrates a portion of the electrical control of our invention in a very simplified and schematic manner, and Fig. 6 shows some curves illustrating the changes produced by our electrical system on the voltage wave generated at the input region of the system.

Figure 1:
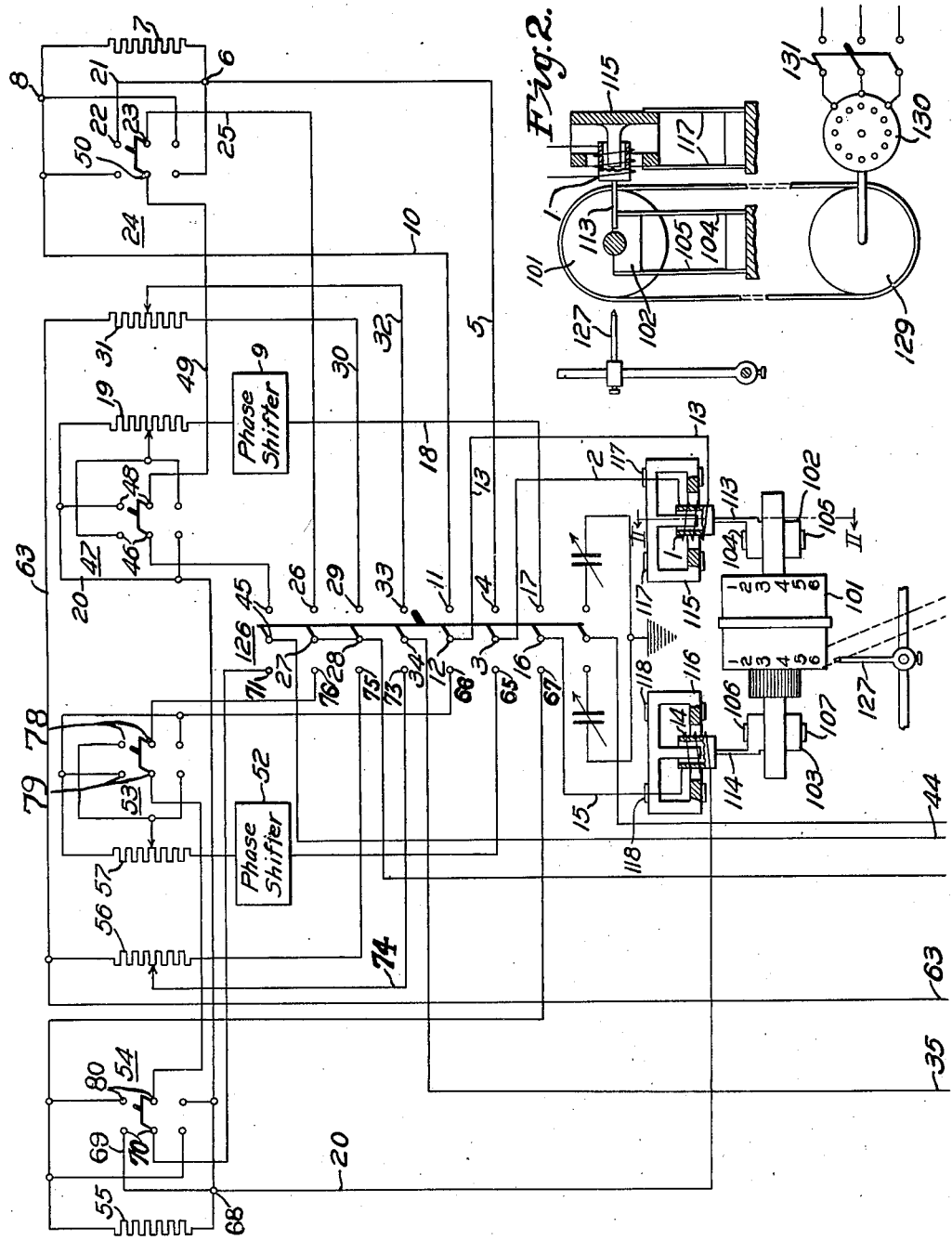
Figs. 1 and 1a show the circuit diagram of the electric apparatus of our invention in combination with schematic illustrations of certain electrical and mechanical features also constituting part of our invention.

A rotor is in balance if the rotation of its mass causes no force reaction on its bearings. Balancing operations are usually directed toward the reduction of vibration rather than directly toward force reaction reduction. The practical minimizing of vibration may in some cases not require the reduction of the unbalance force reaction at all bearings. In such cases the sum of the force reactions on all bearings must be small. In generator rotors in which any sort of non-symmetries may exist require as many locations along (but of course not on) the axis of rotation in which unbalance corrections may be made as there are bearings or other locations at which it is desired to eliminate vibration. The location of these correction planes is quite arbitrary so long as the vibration at each chosen location at which the vibration is to be eliminated is affected by a correction in at least one correction plane.

Fig. 4 represents, without the weights $w_1$ and $w_2$, a perfectly balanced rotor supported in the bearing pedestals $a$ and $b$ and rotating at a constant speed. Let this system be linear, i. e., a force of a given frequency acting at a given point in a given direction will produce motions which are proportional to this force.

Let known unbalances $w_1$ and $w_2$ (vectors) be inserted in the planes of $w_1$ and $w_2$ respectively, at right angles to the axis of rotation, and let the vectors (Fig. 3) of $w_1$ and $w_2$, namely $Vw_1w_2$ and $Vw_2w_1$ be such that their projections $x_a$ and $x_b$ are the vibratory displacements in one direction at $a$ and $b$ respectively due to $w_1$ and $w_2$.

Since $Vw_1w_2$ is the total length of the vector at $a$ caused by both masses, $w_1$ and $w_2$, it is clear that this vector is equal to $Vaw_1+Vaw_2$ where $Vaw_1$ is the effect of $w_1$ at $a$ and $Vaw_2$ is the effect of $w_2$ at $a$. Similarly, $Vw_2w_1=Vbw_1+Vbw_2$ where $Vbw_1$ is the effect of $w_1$ at $b$ and $Vbw_2$ is the effect of $w_2$ at $b$.

Since the system is linear, the rotor symmetrical, and perfectly in balance without $w_1$ or $w_2$, $x_a$ may be divided into the components $x_{a_1}$ due to the unbalance $w_1$ and $x_{a_2}$ due to unbalance $w_2$ and $x_b$ may be divided similarly into $x_{b_1}$ and $x_{b_2}$.

Thus $$x_a = x_{a_1} + x_{a_2} \quad (1)$$
$$x_b = x_{b_1} + x_{b_2} \quad (2)$$

Let any Greek letter, for example $\beta$, with any subscript, be an operator such that its product with a vector, for example $x$, results in a vector $\beta x$ of a certain angular shift and a certain ratio of change in length with respect to $x$.

$x_{a_1}$ will have a fixed angular relation and a fixed ratio of length to $w_1$. Let $\alpha_{a_1}, \alpha_{b_1}, \alpha_{a_2}$ and $\alpha_{b_2}$ be similar operators. Then $$x_{a_1} = \alpha_{a_1} w_1 \quad (3)$$

and $$x_{b_1} = \alpha_{b_1} w_1 \quad (4)$$

Similarly $$x_{a_2} = \alpha_{a_2} w_2 \quad (5)$$

and $$x_{b_2} = \alpha_{b_2} w_2 \quad (6)$$

Elimination of $w_1$ from (3) and (4) gives $$x_{a_1} = \frac{\alpha_{a_1}}{\alpha_{b_1}} x_{b_1} \quad (7)$$

Which means that $x_{a_1}$ and $x_{b_1}$ have a fixed ratio of length and a fixed angular relation as indicated by the operator $$\frac{\alpha_{a_1}}{\alpha_{b_1}}$$

In order to indicate the unbalance $w_2$ we seek a combination of $x_a$ and $x_b$ which will depend only on $w_2$. Inspection of (1) and (2) indicates that $x_a + \beta_2 x_b$ depends only on $w_2$, if $\beta_2$ is such that $$x_{a_1} + \beta_2 x_{b_1} = 0.$$

In short, if $$x_{a_1} + \beta_2 x_{b_1} = 0 \quad (8)$$

$$x_a + \beta_2 x_b = x_{a_2} + \beta_2 x_{b_2} \quad (9)$$

and from (5) and (6)

$$x_{a_2} + \beta_2 x_{b_2} = (\alpha_{a_2} + \beta_2 \alpha_{b_2}) w_2 \quad (10)$$

or $$x_a + \beta_2 x_b = \gamma_2 w_2 \quad (11)$$

where $\gamma_2$ is defined by $$\gamma_2 = (\alpha_{a_2} + \beta_2 \alpha_{b_2}) \quad (12)$$

Incidently comparison of (7) and (8) shows that $$\beta_2 = -\frac{\alpha_{a_1}}{\alpha_{b_1}} \quad (13)$$

(11) is the basis for the use of a network hereinafter described more in detail and (8) is the criterion for adjusting the network.

Metering and operations such as $\beta$ are easily made in electric circuits (although electrical circuits are not essential). For practical ends then the motions at points $a$ and $b$ are converted by vibration pick-up into voltages to correspond to the vectors $E_a$ and $E_b$ respectively. Assuming the two pick-ups are identical (which is not necessary for the operation of the scheme) the relation between $E_a$ and $x_a$ is $$E_a = \phi x_a \quad (14)$$

That between $E_b$ and $x_b$ is, $$E_b = \phi x_b \quad (15)$$

in which $\phi$ depends only on the electrical characteristics of the vibration pick-ups. Defining $E_{a_1}$, $E_{a_2}$, $E_{b_1}$, and $E_{b_2}$ by $$E_{a_1} = \phi x_{a_1}$$
$$E_{b_1} = \phi x_{b_1}$$  (16)

$$E_{a_2} = \phi x_{a_2}$$
$$E_{b_2} = \phi x_{b_2}$$  (17)

Substituting (16) in (8)

$$E_{a_1} + \beta_2 E_{b_1} = 0 \quad (8.1)$$

and substituting (14) and (15) in (11)

$$E_a + \beta_2 E_b = \phi \gamma_2 w_2 = E_2 \quad (11.1)$$

(11.1) indicates that if an electrical network, as shown in Fig. 5, which performs the operation $\beta_2$, is used for shifting phase and changing amount of the voltage $E_b$ the resulting voltage $\beta_2 E_b$ when placed in series with $E_a$ will be a voltage $\phi \gamma_2 w_2 = E_2$ which is proportional to and in fixed phase relation with $w_2$. (8.1) indicates that the network of Fig. 5 is adjusted properly when an unbalance $w_1$ only, results in $E_a (=E_{a_1})$ and $\beta_2 E_b (=\beta_2 E_{b_1})$ adding to zero. Once the network is adjusted, the proportionality factor and the phase relation between $E_2$ and $w_2$ represented by the operator $\phi \gamma_2$ can be determined by inserting a known $w_2$.

Similarly with the same two pick-up voltages $E_a$ and $E_b$ the network may be adjusted so that its operation $\beta_1$ results in $$E_{a_2} + \beta_1 E_{b_2} = 0 \quad (8.2)$$

under which condition, $$E_a + \beta_1 E_b = \phi \gamma_1 w_1 = E_1 \quad (11.2)$$

In the foregoing analysis the adjustments of the network and the calibration to determine $\phi \gamma_1$ and $\phi \gamma_2$ are described with a perfectly balanced rotor. If a perfectly balanced rotor is not available the effects on the pick-up voltages at $a$ and $b$ due to initial unbalance may be removed by inserting equal and opposite voltages in series with the pick-ups. In this way a perfectly balanced rotor may be simulated in the electrical circuit. On completion of the adjustments of the network and the calibration to determine the electric operators $\phi \gamma_1$ and $\phi \gamma_2$, the inserted voltages may be removed and the resulting $E_1$ and $E_2$ interpreted by means of the known electric operators $\phi \gamma_1$ and $\phi \gamma_2$, as the unbalance $w_1$ and $w_2$ which will be the actual total unbalances of the machine, or more strictly the weights which must be removed or compensated for if the motions at $a$ and $b$ are to be made zero.

In a similar manner networks for determining $w_1$, $w_2$ and $w_3$, namely three unbalances in three planes can be adjusted. This same procedure is applicable to a system having $n$ planes for unbalance correction where the motion is to be brought to zero at all of $n$ points in a single direction at each point.

In cases where rotors are balanced in their own bearings, experience has shown that the motion responses are often only approximately linear with respect to the forces. Insofar as there is this non-linearity the method described does not give exact determinations, with the result that after the corrections for the unbalances as indicated are carried out repeat determination and subsequent further correction of unbalances may be necessary. The calibration and setting of network constants used for the first determination will probably be suitable for the second.

Once an unbalance in one correction plane has been changed by the network to a voltage proportional to the unbalance and in fixed phase relation with it the problem becomes simply that of measuring the amount of the voltage and phase of the voltage with respect to the rotation of the rotor. These measurements can be made in several different ways, of which the following is well suited for quantity balancing of rotors. The amount of voltage is measured with an ordinary alternating current meter calibrated in ounces of unbalance. The phase of the voltage, which corresponds to the position of unbalance correction, is indicated by having it control the flashing of a stroboscopic light. A stationary pointer is mounted so that the stroboscopic light illuminates the rotor in that angular position in which the unbalance is opposite the pointer. The angular position of the unbalance is recognized by means of numbers or other identification marks printed on or attached to the rotor.

In our device the electrical measurements hereinbefore mentioned are effected by the coils 20 1 and 14 respectively and by the networks associated with these coils.

In the showing in Fig. 1 it will be noted that the rotor 101 is mounted to rotate freely in space. The ends, or rotor shafts, are disposed in bearings 102 and 103, respectively. These bearings 102 and 103 are mounted on the flexible flat springs 104 and 105, and 106 and 107, respectively, so that the oscillations at the bearings will be either in phase, or 180° out of phase, depending on the position of the actual axis of rotation of the unbalanced rotor with reference to the bearings.

The simplest design is, of course, as shown but the motions, as is evident from the analyses herein made, need not have any definite phase relation. Furthermore, if a fixed pivot be used for the bearings, as is done in prior art devices, our invention will still produce all its novel results, so long as linearity of motion obtains. As pointed out a linear system is one in which a force of a given frequency acting at a given point in a given direction will produce motions which are proportional to this force.

In Fig. 5 coils 1 and 14 are shown schematically.

Note that $E_a$ is the voltage in coil 14 and $E_b$ the voltage of coil 1. By a proper manipulation of the phase shifter 9 and the adjustment of conductor 108 on resistor 109 the effect of operator $\phi \gamma_2$ is secured and the total voltage across conductors 108 and 110 is equal to $E_2$. The indications of meter 112 may thus be made proportional to the unbalance in the plane at the right of the rotor, and, by reason of proper calibration, indicate the actual unbalance in units of mass.

By a further proper manipulation that is, by using operator $\phi \gamma_1$ on the network the actual unbalance in units of mass at the left of the rotor may be indicated. In the network, to get indications of actual unbalance, amplifiers are used and means for changing the sensitivity of the meter are provided.

A general case of mounting is a mounting in almost any bearings. A particular mounting is such as we show where the motions at the two pedestals are in or out of phase and the phase shifter need be adjusted only over a small range or no phase shifter may be required. Generally stated, our invention includes a rotor mounted on the two bearings. These bearings, for the shop machine are mounted on flat springs, and are thus free to oscillate in a substantially horizontal direction. The mounting is such that the motion will not be in planes intersecting each other by an angle greater than 10°. The simplest design is, of course, as shown so that the actual motions at the bearings are either nearly in phase or nearly out of phase by 180°. The phase shifter, therefore, needs to take care of but a small angle to actually bring the voltage in the exact desired phase relation.

The movable coils 1 and 14 are secured to the bearings 102 and 103 by connecting members 113 and 114. These coils are disposed to oscillate in the uniform magnetic field of the magnets 115 and 116.

The magnets 115 and 116 are, with reference to the coils, massive and are mounted on springs 117 and 118 so that all building vibrations are eliminated. In other words, the bearing pedestals with the rotor in position as well as the magnets are mounted so as to have a low frequency of resonance with respect to the running frequency in the direction in which flux is cut by the coil.

The coils are moved in the uniform magnetic field and thus generate substantially sinusoidal voltage impulses as shown by curves 119 and 120 in Fig. 6. These voltage impulses are transmitted to the primary 42 of transformer 43. Transformer 43 is connected to control the grid potential of electric discharge devices 121, 122 and 123.

When the discharge device breaks down an amplified current surge is transmitted to transformer 124 and from thence through the rectifier 125 to the meter 112. The meter thus indicates the magnitude of the unbalance in the rotor. The position of switch 126 correlates the entire network and determines just which unbalance the meter is at the moment to indicate, namely, determines whether the unbalance is being measured in the correction plane at the right or at the left of the main portion of the rotor. In Fig. 5 the major portion of the showing in Fig. 1 is shown schematically. In this Fig. 5, 128 designates the entire system of control between the potentiometer resistors and the meter 112.

Indicating the magnitude of unbalance in two arbitrarily chosen correction planes does, however, not suffice. Obviously, the position, namely, the phase of the unbalance must also be known before proper correction for the unbalance can be made.

In our network the stroboscopic method of determining the phase of the unbalance is used. The voltages generated in the respective coils are sinusoidal and by means of the amplifier tubes the voltage waves are so changed that they have a very steep wave front as indicated by curves 219 and 220. In so changing the wave front no appreciable difference in slope is secured for different wave amplitudes. A constant phase indication is thus secured for large and small unbalances.

In our network the upper portion of the amplified wave is cut off so that the amplified voltage waves will be somewhat as indicated by the curves 221 and 222 in Fig. 6.

If the dot-and-dash line 223 represents the critical potential for the electric discharge device 123 then it is apparent that the discharge device can be caused to break down, that is, become conducting each time the amplified voltages are equal to or greater than the critical potential of the discharge device. Each time the discharge device 123 breaks down a flash of light illuminates the rotor. In other words, the rotor is illuminated each time the unbalance is in a given position in space, that is, is in a given position with reference to pointer 127. In fact the adjustment of the pointer 127 and the network can be such that the pointer will indicate the exact position of the unbalance on the rotor. The light flashes from discharge device 123 will make the rotor appear stationary, in accordance with well known principles.

Figure 1A:
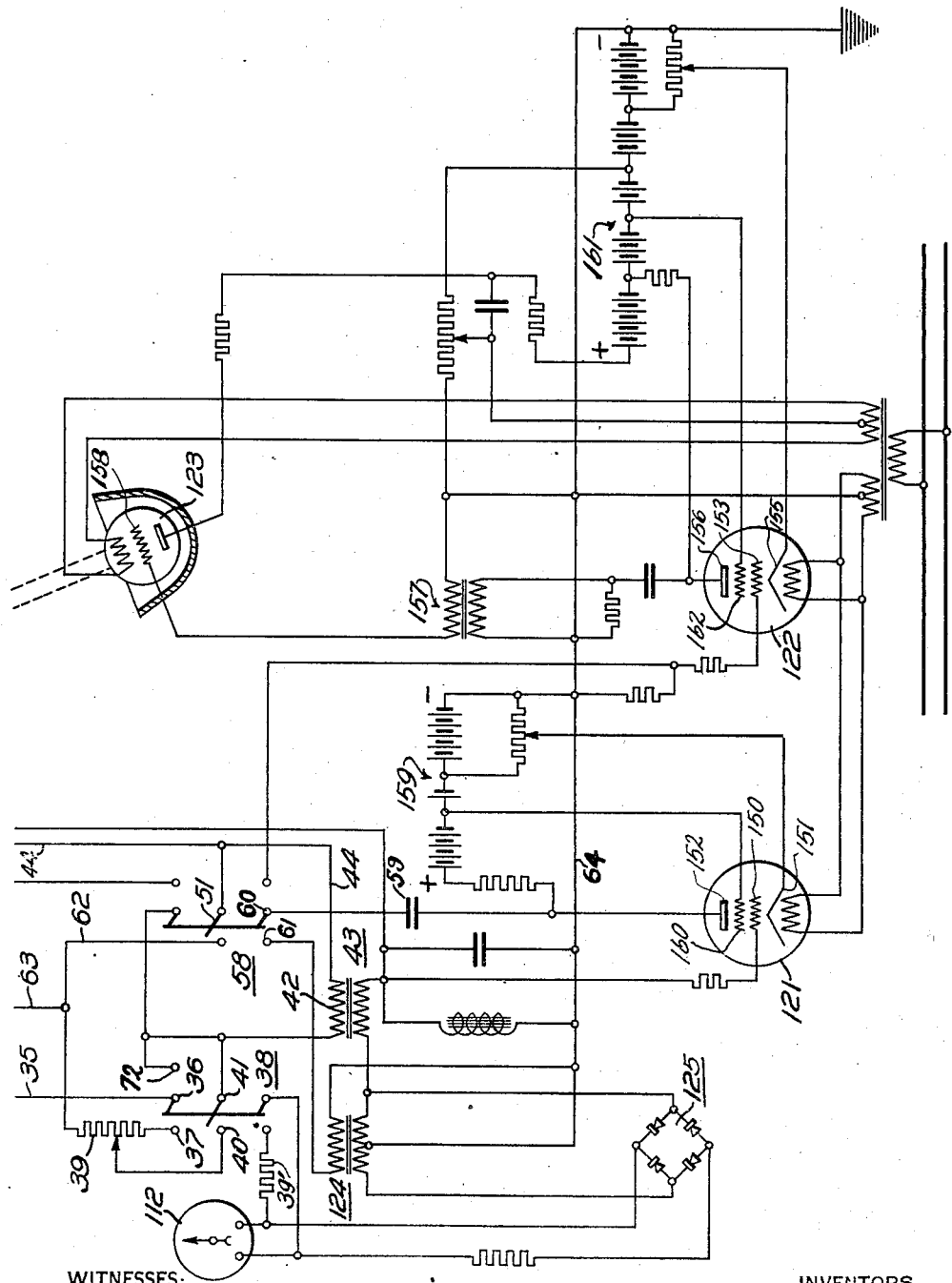

In analyzing the operation of the equipment shown in Figs. 1 and 1a and Fig. 2, let it be assumed that a large number of rotors, all of a given type, that is, substantially the same average weight, and the same dimensional characteristics are to be balanced. A perfectly balanced rotor of the type of rotors that are to be balanced is first placed in the bearings 102 and 103.

The belt-shifting device, not shown, is then operated and the pulley 129 coupled to the motor 130 is thus disposed to drive the balanced rotor. A known unbalance is then placed at the left of the main portion of the rotor and the motor 130 is connected to a source of energy by switch 131 and the rotor is rotated at its normal operating speed.

With switch 126 thrown to the right and the known unbalance at the left only, voltages will, of course, be generated by both coils 1 and 14 because the unbalance at the left will also produce a motion at the right.

The circuit for coil 1 may be traced from the upper end of coil 1 through conductor 2, contact terminals 3 and 4 joined by a blade of switch 126, conductor 5, junction 6, resistor 7, junction 8, conductor 10, contact terminals 11 and 12 bridged by a blade of switch 126, and conductor 13 to coil 1. The circuit for coil 14 may be traced from the coil through conductor 15, contact terminals 16 and 17 bridged by a blade of switch 126, conductor 18, phase shifter 9, resistor 19, and conductor 20 back to the coil 14.

The energy from these coils 1 and 14 is transmitted to our amplifying control for the meter 112 through several circuits. One circuit may be traced from junction 6 through conductor 21, contact terminals 22 and 23 bridged by the reversing switch 24, conductor 25, contact terminals 26 and 27, and 28 and 29 of the switch 126, conductor 30, the lower portion of resistor 31, conductor 32, contact members 33 and 34 of switch 126, conductor 35, contact terminals 36 and 37 of meter sensitivity control switch 38, the lower portion of resistor 39, contact terminals 40 and 41, primary 42 of transformer 43, conductor 44, contact fingers 45 of switch 126, contact members 46 of reversing switch 47, a portion of the resistor 19, contact members 48 of switch 47, conductor 49, contact members 50 of switch 24 and through resistor 7 back to junction 6. The other circuit may be traced from junction 6 to conductor 30 exactly as for the first circuit but includes all of resistor 31, conductor 63, the upper portion of resistor 39 to contact terminal 40 and from that terminal back to junction 6 exactly as the first circuit. From these two circuits discussed in this paragraph, it will be noted that the portion of the first traced circuit from conductor 32 to resistor 19 and including the primary of the transformer 43 is merely a portion of a potentiometer circuit for the primary winding 42 of transformer 43. To clarify the disclosure it should be noted that this potentiometer circuit starts at the adjustable conductor 32 on the resistor 31 passes through contact members 33 and 34 of switch 126, conductor 35, contact terminals 36 and 37 of the meter sensitivity control switch 38, the lower portion of resistor 39, contact terminals 40 and 41, primary winding 42 of the transformer 43, conductor 44, contact fingers 45 of switch 126, contact members 46 to the adjustable junction on resistor 19. When the voltages of coils 1 and 14 are caused to be 180° out of phase a point of zero potential for primary 42 may be found by merely shifting conductor 32 on resistor 31.

At each voltage impulse in the circuit just traced, which impulse is the resultant of the impulses of the two coils 1 and 14, the electric discharge device 121 becomes conducting and thus produces an impulse on transformer 124. Since the meter 112 is connected to the transformer 124 through the rectifier 125, the meter will give an indication, that is, the pointer will swing over the calibrations.

By reversing one of the switches 24 or 47, and observing the meter the attendant can readily determine whether or not the voltages of coils 1 and 14 are somewhere nearly in phase or somewhere nearly 180° out of phase because the voltages will thus be added or subtracted from one another. The particular switch that was operated is then finally left in such a position that the voltages are at least in the same quadrant. By manipulation of the phase shifter 9 the voltages are brought exactly in phase or 180° out of phase. For the shop machine, where both the rotor being balanced and the magnets for the coil are mounted on springs and the movements are in substantially the same planes, the voltages will normally be either nearly in phase or nearly 180° out of phase. After a reversing switch has been operated but small adjustment if any of the phase shifter is needed to bring the voltages in phase. Phase shifters are usually designed to have only a range of 180° and reversing switches are thus essential.

There are phase shifters however, that are designed to shift the phase over 360° so that our scheme is capable of solving the general problems of unbalance without the use of reversing switches. With a phase shifter of a 360° range reversing switches are not a necessity, but they are nevertheless useful to restrict the necessary adjustment range of the phase shifter.

After the voltages are adjusted to be exactly out of phase, the adjustment of conductor 32 on resistor 31 is changed until the meter 112 indicates zero, which means that the voltage of pick-up 1 is added to a certain portion of the voltage of the pick-up 14 to give a combination of the two voltages which is independent of an unbalance placed in the left end of the rotor and is a solution of Equation (11.2). This combination of the voltages will thus give results proportional to the unbalance in the right end of the rotor. By placing a known weight of unbalance in the right end and by throwing switch 38 to the right or left and switch 58 to the left and by suitably adjusting the operating characteristics of the electric units in Fig. 1a affecting the operation of the meter 112, this meter may be caused to read in actual units of mass.

Normally when for the moment the magnitude of the unbalance is to be indicated by meter 112 switch 58 will be thrown to the left so that condenser 59 will be charged by the high voltage source of direct current 159, i. e., the battery 159. The circuit for the condenser 59 may be traced from the positive terminal of the battery 159 to condenser 59 contact fingers 60 and 61 bridged by a blade of switch 58, the primary of transformer 124, and conductor 64 to the negative terminal of the battery 159. When discharge device 121 becomes conducting, as hereinbefore explained, the high voltage of the source of direct current 159 is substantially removed from the condenser 59 with the result that the condenser discharges and thus produces an impulse in the primary winding of transformer 124. The meter 112, being connected in circuit with the secondary of transformer 124, will thus indicate unbalance.

As has already been stated, by suitable adjustment of the operating characteristics of the electric units in Fig. 1a affecting the operation of the meter 112 this meter will indicate units of unbalance mass directly.

Once the system has been adjusted as hereinbefore discussed, then rotor after rotor whose unbalances are not known may be inserted in the bearings 102 and 103 and the magnitude of the unbalance of each one at the right thereof may be indicated. However, to known the unbalance at one end only does not suffice.

To get the system in condition to indicate correct unbalance of rotors at the left switch 126 is thrown to the left and switch 38 is left in the left hand position. A known unbalance is then placed at the right of the main portion of the rotor and motor 130 is connected to a source of energy by switch 131 and the rotor is rotated at its normal operating speed.

With switch 126 thrown to the left and the known unbalance at the right only, voltages will be generated by both coils 1 and 14 because the unbalance at the right will also produce a motion at the left.

As hereinbefore stated switch 38 may be either in the right hand position or the left position without affecting the theory of operation of the system. When the switch 38 is in the left hand position the meter 112 is merely less sensitive than when the switch 38 is in the right hand position. For the discussion of, the circuits, the theory of calibration, and the unbalance indicating operations presently to be discussed for the left hand position of switch 126, switch 38 will be considered as being in the right hand position.

The circuit for coil 1 may be traced from the upper end of coil 1 through conductor 2, contact terminals 3 and 65, phase shifter 52, resistor 57, contact terminals 66 and 12 and conductor 13 to the lower end of coil 1. The circuit for coil 14 may be traced from the upper end of coil 14 through conductor 15, contact terminals 16 and 67, resistor 55, and conductor 20 to the lower end of coil 14.

The energy from these coils 1 and 14 is transmitted to our amplifying control for the meter 112 through a circuit. This circuit may be traced from junction 68, conductor 69, contact fingers 70 of switch 54, contact fingers 71 and 45, conductor 44, primary 42 of transformer 43, contact fingers 72 and 36, conductor 35, contact fingers 34 and 73, conductor 74, the lower portion of resistor 56, contact fingers 75, 28, 27 and 76 of switch 126, contact fingers 78 of switch 53, the upper portion of resistor 57, contact fingers 79 of switch 53, to contact members 80 of switch 54 and through all of resistor 55 back to junction 68. From the circuit just discussed it will be apparent that the position of the circuit between the point of adjustment of conductor 74 on resistor 56 and the point of adjustment of the adjustable conductor on resistor 57 and including the primary 42 is merely a portion of a potentiometer for the primary 42.

When the voltages of coils 1 and 14 are caused to be 180° out of phase a point of zero potential for the primary 42 may be found by merely shifting conductor 74 on resistor 56.

The meter will normally be affected and show unbalance but if the voltages are adjusted to be exactly 180° out of phase the conductor 74 may be adjusted on resistor 56 until the meter 112 indicates zero, which means that the voltage of pick-up coil 14 is added to a certain portion of the voltage of pick-up coil 1 to give a combination of voltages which is independent of an unbalance in the right end of the rotor. This combination of the voltages will thus give results proportional to the unbalance in the left end of the rotor. By now placing a known weight of unbalance in the left end of the rotor and by suitably adjusting the operating characteristics of the electric units in Fig. 1a affecting the meter indications, the member 112 may be caused to read in actual units of unbalance mass.

Once the system has been adjusted as just explained then rotor after rotor whose unbalances are not known may be inserted in the bearings 102 and 103 and the magnitude of the unbalance of each one at the left thereof may be indicated.

The procedure for getting correct indication of unbalance at the left as just explained is carried out by throwing switch 126 to the left, adjusting phase shifter 52, manipulating reversing switches 53 and 54, using the resistors 55, 56 and 57, etc. The switch 58 remains in the left hand position so long as merely magnitudes of unbalance at the right and left are indicated. It will thus be noted that the right terminal of the primary 42 is connected to the upper terminal of resistor 56. The circuit for this connection may be traced from conductor 44 through contacts 51 of switch 58 and conductors 62 and 63 to the resistor 56.

Switch 38 merely controls the sensitivity of meter 112. When switch 38 is moved to the left, the actuating coil of the meter is shunted through a resistor 39' and resistor 39 is also so connected as to affect the sensitivity of the meter. The shunt through resistor 39' affects the operation of the meter 112 directly whereas resistor 39 affects the meter 112 indirectly by modifying the effect of the total voltage of coils 1 and 14. The operation of the entire system is fundamentally the same regardless of whether the switch 38 is in the right hand or left hand position. Switch 58, on the other hand, is thrown either to the left or the right, depending on whether unbalance or the phase of the unbalance is to be determined. The circuit for the meter 112 is clear from a mere inspection of Fig. 1a.

After the network is set successive rotors are placed in the bearings 102 and 103 and the magnitude of unbalance at the right of the main portion of the rotor is read from the meter by merely throwing switch 126 to the right and a similar reading of unbalance can be taken at the left by throwing switch 126 to the left.

By shifting switch 58 to the right, electric discharge devices 122 and 123 are interconnected with electric discharge device 121. Since such circuit connection causes the voltage of the coils 1 and 14 to be amplified as indicated in Fig. 6, discharge device 123 is caused to break down each time the unbalance on the rotor has a definite position in space. By providing electric discharge device 123 with a reflector to direct the light thereof on the rotor, the pointer 127 will indicate the exact phase of the unbalance.

If switch 58 is in the right hand position the transformer 43 is nevertheless energized because the junctions 27 and 28, regardless of what position the switch 126 may hold are connected directly to the uppermost blade of switch 58. Device 121 may thus be caused to operate regardless of whether the phase of unbalance or the magnitude thereof are at a given instant being investigated.

With switch 58 in the right hand position device 121 is connected to device 122. Operation of device 121 thus successively effects the operation of devices 122 and 123, whereby the phase of unbalance is indicated.

Since both the phase, or position, and the magnitude of the unbalance are indicated, the attendant need only remove, at the points indicated by the pointer 127, a mass of material equal to the mass of unbalance indicated by the meter 112 and the rotor is balanced. It is thus readily apparent that each rotor can be balanced in a very short time. The rotor need merely be mounted, brought up to speed, a few switches manipulated, and note needs to be taken of both magnitude and phase of unbalance. To facilitate determining the phase of unbalance, the rotor is usually provided with numerals uniformly spaced about the periphery of the rotor.

After suitable manipulation of the proper phase shifter and the adjustment of the adjustable conductors on the resistors 19 and 31, 56 and 57—the selection of the particular adjustments to be made, of course, depending upon the position of switch 126—the potential or voltage generated by the coils 1 and 14, which is proportional to the unbalance in one of the arbitrarily chosen planes of the rotor to be balanced, is transmitted to the transformer 43 and in consequence the grid potential of the grid 150 with reference to the cathode 151 of the electric discharge device 121 is changed. When the potential is of the appropriate value, the electric discharge device 121 becomes conducting and at that instant current flows from the anode 152 to the cathode 151. The grid potential of the grid 153 of the electric discharge device 122 is changed with reference to the cathode 155 by such current flow and electric discharge device 122 becomes conducting. As the current impulse flows through the electric discharge device 122 from the anode 156 to the cathode 155, the transformer 157 is energized and in consequence the grid 158 of the electric discharge device or stroboscopic light 123 is varied and this stroboscopic light 123 will be energized to thus illuminate the rotor when the rotor is in a given position, namely, the position indicating the unbalance.

The electric discharge device 121, as is apparent from a mere inspection of the diagram, is shown connected to the battery 159 in such a manner that the negative potential on the cathode 151 may be adjusted and the critical potential may also be adjusted by the potential of grid 160 which places a predetermined bias on the electric discharge device.

The electric discharge device 122 is similarly connected to a battery 161 and also has a grid 162 for placing a predetermined bias on the electric discharge device 122. The polarities of the batteries are as indicated and it should, therefore, be clear to those skilled in the art how this amplifying circuit operates. However, for a somewhat more detailed description, reference may be had to the copending application hereinafter referred to.

A detailed explanation of the function of each of the electrical units shown in Figs. 1 and 1a is not given because it is believed those skilled in the art will not have any difficulty in understanding the disclosure of our invention herein given. In this connection, attention is called to the application of Lloyd E. Swedlund, filed August 15, 1935, Serial No. 36,320, entitled Amplifier circuits.

It is, of course, readily apparent to those skilled in the art, particularly after having had the benefit of the teachings of our invention, to devise other circuit diagrams and arrangements thereof and entirely different devices for accomplishing like results. We are well aware of the fact that a supply of alternating current in combination with suitable rectifiers and filters may be used instead of the batteries shown. In fact, our practical network is associated with a supply of alternating current for the electric discharge devices 121, 122 and 123. To get a high direct current voltage, a pair of electronic rectifiers and an elaborate filter circuit is required. Since such filter circuits and electronic rectifiers are not part of this invention and would, if given, only complicate the disclosure they have been omitted.

From the foregoing explanations, it is apparent we do not wish to be limited to the specific showing made but wish to be limited only by the pertinent prior art and the scope of the appended claims.

We claim as our invention:

1. Apparatus for balancing rotors, in combination, means for mounting a rotor so that it is substantially free to rotate in space, whereby any arbitrarily chosen point on the geometric axis of the rotor by reason of the unbalance of the rotor will rotate about the inertia axis in a given plane of rotation including said chosen point; means for rotating the rotor at its normal operating speed, means responsive to the amplitude of vibration of the arbitrarily chosen point on the geometric axis of the rotor; and means adapted to select only such portion of the amplitude of vibration of said chosen point as is indicative of the magnitude of unbalance of the rotor in the said plane of rotation, including the arbitrarily chosen point.

2. Apparatus for balancing rotors, in combination, means for mounting a rotor so that it is substantially free to rotate in space, whereby any arbitrarily chosen point on the geometric axis of the rotor by reason of the unbalance of the rotor will rotate about the inertia axis; means for rotating the rotor at its normal operating speed; means responsive to the amplitude of vibration in a given plane of an arbitrarily chosen point on the geometric axis of the rotor; and electronic means adapted to select and amplify only such portion of the amplitude of vibration of said chosen point as is indicative of the magnitude of unbalance of the rotor in the plane of rotation, including the chosen point.

3. Apparatus for balancing rotors, in combination, means for mounting a rotor so that it is substantially free to rotate in space, whereby any arbitrarily chosen point on the geometric axis of the rotor by reason of the unbalance of the rotor will rotate about the inertia axis; means for rotating the rotor at its normal operating speed, means responsive to the amplitude of oscillation in the plane of the arbitrarily chosen point on the geometric axis of the rotor; means adapted to select only such portion of the amplitude of vibration of said chosen point as is indicative of the magnitude of unbalance of the rotor in the plane of rotation, including said point, and means for indicating the phase of the unbalance of the rotor in the said arbitrarily chosen plane of rotation.

4. Apparatus for balancing rotors, in combination, means for rotating a rotor at a selected speed; whereby the geometric axis of the rotor will oscillate about the inertia axis and thus cause a vibration of the rotor bearings proportional to the unbalance; electromagnetic means responsive to the vibration of the geometric axis in a given plane of rotation; means for selecting the effect of only such portion of the vibration as is caused by an unbalance in an arbitrarily chosen plane of rotation; and means for indicating both the magnitude and phase of the unbalance in such arbitrarily chosen plane of rotation.

5. Apparatus for balancing rotors, in combination, means for rotating a rotor at its normal operating speed; whereby the geometric axis of the rotor will oscillate about the inertia axis and thus cause a vibration of the rotor bearings proportional to the unbalance; electromagnetic means responsive to the vibration of the geometric axis in a given plane of rotation; means for selecting the effect of only such portion of the vibration as is caused by an unbalance of the rotor in an arbitrarily chosen plane of rotation; and electronic means for indicating both the magnitude and phase of the unbalance in such arbitrarily chosen plane of rotation.

6. Apparatus for balancing rotors, in combination, means for rotating the rotor at its normal operating speed, whereby the geometric axis of the rotor will oscillate about the inertia axis and thus cause a vibration of the rotor bearings proportional to the unbalance; electromagnetic means responsive to the vibration of the geometric axis in a given plane of rotation of the rotor; means for selecting the effect of only such portion of the vibration as is caused by an unbalance of the rotor in an arbitrarily chosen plane of rotation; means for indicating the magnitude of the unbalance in such arbitrarily chosen plane of rotation; and means indicating the phase of the unbalance on the rotor in such arbitrarily chosen plane of rotation.

7. The combination with an oscillatory member, of a yielding support therefor, electromagnetic means disposed to generate an alternating current by the oscillations of said oscillatory member, means adapted to select only such portion of the voltages generated by the electromagnetic means as indicates the magnitude of the force in an arbitrarily chosen plane of oscillation causing the oscillation, and means for amplifying and indicating the magnitude of the portion of the voltages selected.

8. In a balancing machine, a yielding support for a rotor the unbalance of which is to be determined, means for generating an alternating current disposed to be operated by the vibrations of the support by reason of the rotor unbalance when said rotor is operated, that is, rotated at its normal speed, means for selecting that portion of the voltage generated by said generating means that is proportional to the unbalance of the rotor in an arbitrarily chosen plane of rotation of the rotor, and means for so changing the characteristic of the voltage selected that actual units of unbalance are indicated by the voltage.

9. In a balancing machine, a yielding support for a rotor the unbalance of which is to be determined, means for generating an alternating current disposed to be operated by the vibrations of the support by reason of the rotor unbalance when said rotor is operated, that is, rotated at its normal speed, means for selecting that portion of the voltage generated by said generating means that is proportional to the unbalance of the rotor in an arbitrarily chosen plane of rotation, means for so changing the characteristic of the voltage selected that actual units of unbalance are indicated by the voltage, and means adapted to indicate the position of the unbalance of the rotor in the arbitrarily chosen plane of rotation.

10. Apparatus for balancing rotors, in combination, means for mounting a rotor so that it is substantially free to rotate in space, whereby a pair of arbitrarily chosen points on the geometric axis of the rotor, by reason of the unbalance of the rotor, will rotate about the inertia axis; means for rotating the rotor at its normal operating speed; a pair of electric current generating means responsive respectively to the oscillations in selected directions of the arbitrarily chosen points; and means adapted to select only such portions of the respective currents generated by said last named means that are proportional to the unbalance of the rotor in two arbitrarily chosen planes of rotation; and means for indicating the magnitudes of such unbalance in said rotor at said arbitrarily chosen planes of rotation.

11. Apparatus for balancing rotors, in combination, means for mounting the rotor so that it is substantially free to rotate in space, whereby any pair of arbitrarily chosen points on the geometric axis of the rotor, by reason of the unbalance of the rotor, will rotate about the inertia axis; means for rotating the rotor at its normal operating speed; a pair of electric current generating means responsive respectively to the oscillations in selected directions of the arbitrarily chosen points in the geometric axis; and means adapted to select only such portions of the respective currents generated by said last named means that are proportional to the unbalance of the rotor in two arbitrarily chosen planes of rotation; means for indicating the magnitudes of such unbalance in said rotor at said arbitrarily chosen planes of rotation; and means for indicating the phase of the unbalance.

12. In a balancing machine, in combination, means for generating a voltage proportional to the vibration in one plane of rotation of an unbalanced rotor, means for generating a voltage proportional to the vibration in another plane of rotation of said unbalanced rotor, means for changing the phase and magnitude of one of said voltages so that it is in phase with the other voltage and produces a resultant voltage that is proportional to the unbalance of the rotor in a certain but arbitrarily chosen plane of rotation.

13. In a balancing machine, in combination, means for generating a voltage proportional to the vibration in one plane of rotation of an unbalanced rotor, means for generating a voltage proportional to the vibration in another plane of rotation of said unbalanced rotor, means for changing the phase and magnitude of one of said voltages and for producing a resultant voltage that is proportional to the unbalance of the rotor in a certain but arbitrarily chosen plane of rotation, and means for changing the character of the resultant voltage so that it indicates actual units of mass of unbalance in said chosen plane of rotation.

14. In a balancing machine, in combination, means for generating a voltage proportional to the vibration in one plane of rotation of an unbalanced rotor, means for generating a voltage proportional to the vibration in another plane of rotation of said unbalanced rotor, means for changing the phase and magnitude of one of said voltages so that it is in phase with the other voltage and produces a resultant voltage that is proportional to the unbalance of the rotor in a certain but arbitrarily chosen plane of rotation and means for indicating the position of the unbalance on the rotor in said chosen plane of rotation.

15. In a balancing machine, in combination, means for generating a voltage proportional to the vibration in one plane of rotation of an unbalanced rotor, means for generating a voltage proportional to the vibration in another plane of rotation of said unbalanced rotor, means for changing the phase and magnitude of one of said voltages so that it is in phase with the other voltage and produces a resultant voltage that is proportional to the unbalance of the rotor in a certain but arbitrarily chosen plane of rotation, means for changing the character of the resultant voltage so that it indicates actual units of mass of unbalance in said chosen plane of rotation and means for indicating the position of the unbalance on the rotor in said chosen plane of rotation.

16. In a balancing machine for rotors, the combination of means adapted to rotate a rotor freely in space whereby said rotor will rotate about its inertia axis and any two points on the geometric axis will oscillate harmonically in two lines perpendicular to the inertia axis and including said points, means for generating alternating current voltages proportional to the oscillations of said points in the geometric axis, and means adapted to change the phase and magnitude of one of said voltages so as to produce a resultant voltage that is proportional to the unbalance of the rotor in a selected plane of rotation.

17. In a balancing machine, the combination of, a rotor mounted to rotate freely in space whereby it will rotate about its inertia axis and any two points on the geometric axis will oscillate harmonically in two lines perpendicular to the inertia axis and including said points, means for generating alternating current voltages proportional to the oscillations of said points in the geometric axis, means adapted to change the phase and magnitude of one of said voltages so as to produce a resultant voltage that is proportional to the unbalance of the rotor in a selected plane of rotation and means for indicating the phase of the unbalance of the rotor in a chosen plane of rotation.

18. Apparatus for indicating unbalance of a rotating machine element, in combination, means for mounting the element so that it is free to rotate in space, whereby any arbitrarily chosen point on the geometric axis of the element, by reason of the unbalance of the element, will rotate about the inertia axis of the element; means for rotating the element; means responsive to the vibrations in a given plane including the axis of rotation of the arbitrarily chosen point with reference to the inertia axis caused by the rotation of the geometric axis about the inertia axis; and means for indicating only that portion of the vibration caused by the unbalance in a plane normal to the axis of rotation and including the arbitrarily chosen point.

19. Apparatus for indicating unbalance of a rotating machine element, in combination, means for mounting the element so that its axis of rotation may take any position in a given plane in space, whereby any arbitrarily chosen point on the geometric axis of the element, by reason of the unbalance of the element, will oscillate with reference to the inertia axis, or axis of rotation, of the element; means for rotating the element; means responsive to that portion of the vibration of the arbitrarily chosen point with reference to the inertia axis caused by the unbalance in the plane of the point at right angles to the axis of rotation; and means for indicating the phase of the unbalance indicated by said last named means.

20. Apparatus for balancing rotors, in combination, means for mounting a rotor so that its axis of rotation may take any position in a given plane in space, whereby any arbitrarily chosen point on the geometric axis of the rotor by reason of the unbalance of the rotor will vibrate with reference to the inertia axis or axis of rotation; means for rotating the rotor at its normal operating speed; means responsive to the amplitude of oscillation of the geometric axis produced by only the unbalance in the plane normal to the axis of rotation and including the arbitrarily chosen point; and means for indicating the said amplitude of vibration measured by said last named means.

21. Apparatus for balancing rotors, in combination, means for mounting a rotor so that its axis of rotation may take any position in a given plane in space including the geometric axis, whereby any arbitrarily chosen point on the geometric axis of the rotor by reason of the unbalance of the rotor will oscillate in said given plane about the inertia axis, or axis of rotation; means for rotating the rotor at its normal operating speed; means responsive to the amplitude of oscillation in a given line determined by the intersection of the said given plane and a plane normal to the axis of rotation of the arbitrarily chosen point on the geometric axis of the rotor; and means for indicating the phase of only that unbalance in the plane normal to the axis of rotation and including the arbitrarily chosen point.

22. Apparatus for balancing rotors, in combination, means for mounting a rotor in a plurality of floating bearings, means for rotating a rotor, the unbalance of which is to be indicated, at its normal operating speed, means, coupled to each of the floating bearings responsive only to the magnitude of unbalance in a rotor in an arbitrarily chosen correction plane substantially perpendicular to the axis of rotation of the rotor, and means for indicating the phase of the unbalance in the said arbitrarily chosen correction plane.

23. Apparatus for balancing rotors, in combination, means for mounting a rotor in a plurality of bearings none of which are fixed but all of which are free to oscillate in lines determined by the intersections of planes perpendicular to the axis of rotation of the rotor with a plane including the axis of rotation, means for rotating a rotor at a given speed whereby the bearings will all oscillate if the rotor be unbalanced, control means responsive to the oscillations of the bearings, and indicating means adapted to automatically segregate from the amplitudes of the oscillations of the bearing only such portion as is indicative of the magnitude of the unbalance of the rotor in one arbitrarily chosen correction plane.

24. Apparatus for balancing rotors, in combination, means for mounting a rotor in a plurality of bearings none of which are fixed but all of which are free to oscillate in lines determined by the intersection of planes perpendicular to the axis of rotation of the rotor with a plane including the axis of rotation, means for rotating a rotor at a given speed whereby the bearings will all oscillate if the rotor be unbalanced, control means responsive to the oscillations of the bearings, indicating means adapted to automatically segregate from the amplitudes of the oscillations of the bearing only such portion as is indicative of the magnitude of the unbalance of the rotor in one arbitrarily chosen correction plane, and indicating means adapted to indicate the phase of the unbalance in the arbitrarily chosen correction plane.

25. Apparatus for balancing rotors, in combination, means for mounting a rotor in a plurality of bearings none of which are fixed but all of which are free to oscillate in lines determined by the intersections of planes perpendicular to the axis of rotation of the rotor with a plane including the axis of rotation, means for rotating a rotor at a given speed whereby the bearings will all oscillate if the rotor be unbalanced, electric control means coupled to each of the bearings responsive to the oscillations of the bearings, and electric indicating means adapted to automatically segregate from the amplitudes of the oscillations of the bearing only such portion as is indicative of the magnitude of the unbalance of the rotor in one arbitrarily chosen correction plane.

26. Apparatus for balancing rotors, in combination, means for mounting a rotor in a plurality of bearings none of which are fixed but all of which are free to oscillate in lines determined by the intersections of planes perpendicular to the axis of rotation of the rotor with a plane including the axis of rotation, means for rotating a rotor at a given speed whereby the bearings will all oscillate if the rotor be unbalanced, electric control means coupled to each of the bearings responsive to the oscillations of the bearings, electric indicating means adapted to segregate from the amplitudes of the oscillations of the bearing only such portion as is indicative of the magnitude of the unbalance of the rotor in one arbitrarily chosen correction plane, and indicating means adapted to indicate the phase of the unbalance in the arbitrarily chosen correction plane.

JOHN G. BAKER.
FRANK C. RUSHING.